Nov. 2, 1965   R. H. SLOWINSKI ETAL   3,214,875
WALL SUPPORTING AND FASTENING MEANS
Filed Feb. 12, 1962
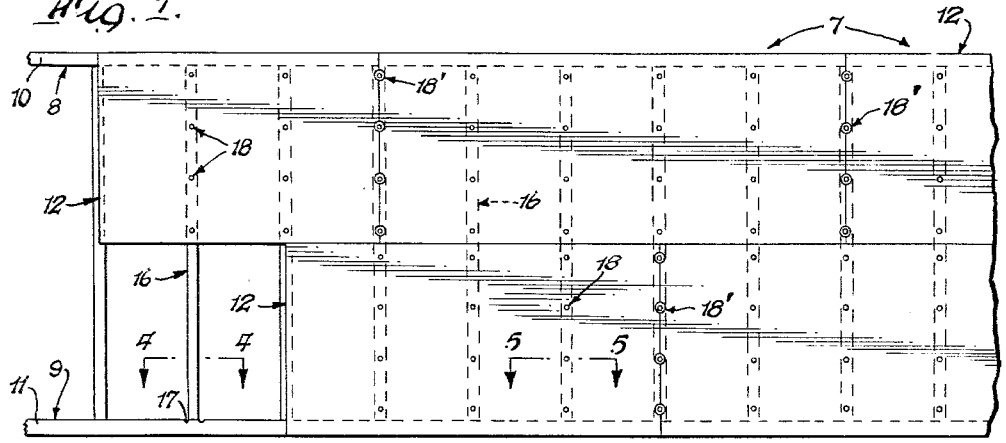
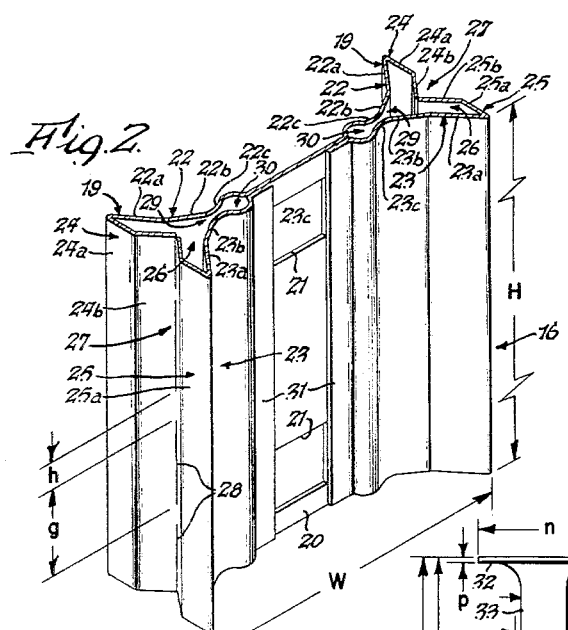
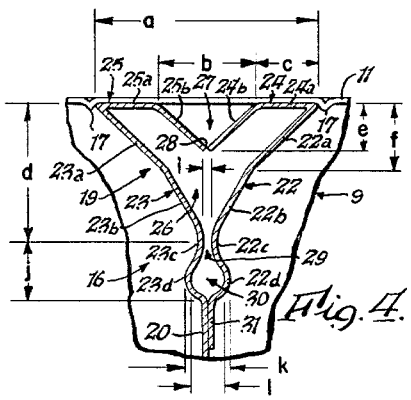
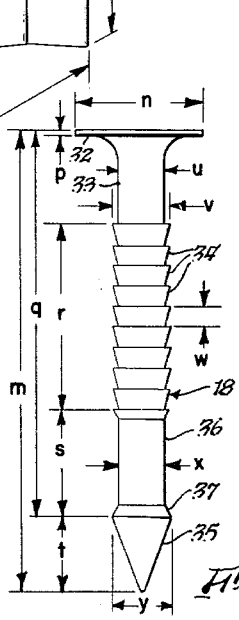
INVENTORS
ROBERT H. SLOWINSKI
JACK A. DAWDY
BY Popp and Sommer
ATTORNEYS

United States Patent Office 3,214,875
Patented Nov. 2, 1965

3,214,875
WALL SUPPORTING AND FASTENING MEANS
Robert H. Slowinski, Tonawanda, and Jack A. Dawdy, Kenmore, N.Y., assignors to National Gypsum Company, Buffalo, N.Y., a corporation of Delaware
Filed Feb. 12, 1962, Ser. No. 172,530
4 Claims. (Cl. 52—364)

This invention relates to improvements in wall construction, and more particularly to improved means, such as a nailing channel, for supporting wall covering and improved means, such as a ratchet nail, for fastening the wall covering to the wall supporting means.

In prior art wall construction it is customary to employ hollow metallic nailing channels for supporting the wall covering and sharp pointed ratchet nails passing through the wall covering into these channels for fastening the wall covering to the channel. Where these channels are intended to be used as studs, i.e. the basic support of a wall, they have the general cross-sectional shape of an I-beam and are provided with a relatively thin, inner web portion and opposed hollow outer nail receiving portions. In such channels, the hollow nail receiving portion includes inner side walls and outer end walls defining a chamber, the outer end walls converging inwardly to form a V-shaped recess in the exposed face of the nail receiving portion and defining at their inner or adjacent edges a slit or slot extending longitudinally of the channel at the base of the recess. The pointed ratchet nail for fastening the wall covering to the channel can be forced through this slot into the chamber and theoretically into non-retractable engagement with the inner edges of the end walls, since these walls are supposed to have sufficient resiliency not only to be spread apart by such penetration but also to snap back into engagement behind the corresponding ratchet on the nail.

However, the prior art arrangement of the side walls of the nail receiving portion together with the pointed end of the nail create certain undesirable problems. For example, on one type of prior art construction, as shown and described in United States Patent 2,633,945, the channels are composed of individual profiles each forming one half of the nail receiving and web portions and welded together along the web forming portion into a composite profile, wherein the straight side walls of the nail receiving portions are substantially parallel and spaced relatively far apart until they dovetail into the web portion. Thus, a substantial part of the elongated ratchet portion or stem of the nail projects freely beyond the single point of engagement with the end walls into the relatively large chamber or space between these side walls. As a consequence, the nail and wall covering often become loose because of the numerous vibrations set up in subsequent nailing. Furthermore, the intricate dovetail shape of the patented nailing channel unduly increases its cost of manufacture especially because of the many roll-forming or bending operations required.

The nail receiving portion of another type of prior art nailing channel is characterized by straight side walls which taper inwardly in the form of a V into abutting engagement and merge into a web portion, the adjacent or outer section of which is roll-formed or bent into a double S or similarly shaped curve. This channel is also formed of individual profiles each forming one half of the nail receiving and web portions, like the profiles of the aforesaid patent, but further differs therefrom in that these profiles are not welded together along the web portion to form a rigid or unitized channel of composite profile but are merely stapled together adjacent the curved sections of the web portion. The purpose of this construction is to provide a rigid joint by means of additional points of engagement between the inner end of the pointed nail which spreads not only the converging end walls, as in the patented construction, but also the stapled profiles and projects into engagement between the curved web sections of these profiles.

Unfortunately, this arrangement is not completely satisfactory for several reasons. First of all, much of the added rigidity desired is lost because of the looseness created by the spreading of the stapled profiles. Secondly, the use of a pointed nail results in undesirable puncturing of the tapering side walls of the nail receiving portions or the curved web forming profiles unless care is taken to ensure that the point of the nail is accurately located between these profiles in the first instance, and this is not easy to do because the point is not visible once it passes between the end walls. Thirdly, to guard against this accidental puncturing, it is necessary to employ a much heavier gauge of metal than would normally be required for structural purposes, and this cost together with the cost involved in the numerous roll-forming or bending operations required to produce the intricate separate profiles, especially the double S curved web sections, as well as the cost of stapling these profiles together, all contribute to an unnecessarily expensive product.

Still another, and more recent, type of construction is disclosed in the copending application of Robert H. Slowinski, Serial No. 165,796, filed January 12, 1962 and now abandoned. This construction has effectively overcome the various disadvantages of the aforesaid prior art devices by providing a channel which is in itself rigid both before and after assembly with the nail and wall covering; which channel is adapted to produce a rigid joint between the nail, wall covering and channel by securely engaging the wall covering and the elongated ratchet portion of the nail near its free end or nose portion as well as near its other or head portion; which channel is designed to provide a positive guide for the nail; and which channel is economical to manufacture because of its relatively simple configuration and its capability of being easily fabricated from preferably a single sheet of relatively light gauge metal, such as steel to provide a wall thickness of a gauge as light as 25 U.S.S., the selection of the gauge being influenced by structural requirements, rather than by pointed nail resistance. This construction also incorporates a nail which is designed to prevent puncturing of the channel.

However, such recent construction has certain inherent limitations. First, it has been found that when a channel side wall thickness of less than 25 gauge U.S.S. is used, the frictional engagement between the channel side walls and the ratchets near the nose of the nail is not sufficient to prevent slight retraction or "popping" of the nails. As will be evident this "popping" not only results in a less rigid joint, but the protruding nail heads are unsightly, especially in a finished wall. Secondly, the limitation on channel wall thickness keeps materials and fabrication costs higher than they would be if a thinner wall could be used. Thirdly, this construction utilizes a blunt nose nail in order to ensure against puncturing of the straight inwardly converging channel side walls.

Accordingly, it is a primary object of this invention to overcome these and other disadvantages of the above constructions, by providing improved means, such as a nailing channel for supporting wall covering, and improved means, such as a ratchet nail, for fastening the wall covering to the wall supporting means.

Another object is to provide an improved nailing channel which is in itself rigid both before and after assembly with the nail and wall covering; which channel is adapted to produce a rigid joint between the nail, wall covering and channel by securely engaging the wall covering and by snapping back into non-retractible engagement with the nail stem behind the nose of the nail, as well as by snapping back into non-retractible engagement behind the ratchets nearer the nail head; which channel is designed to provide a positive guide for the nail and thereby permit the use of pointed nails without fear of puncturing the channel side walls; and which channel is economical to manufacture because of its relatively simple configuration and its capability of being easily fabricated from preferably a single sheet of relatively light gauge metal, such as steel, to provide a wall thickness of suitable gauge, such as 26 U.S.S., the selection of the gauge being influenced by structural requirements, rather than by pointed nail puncture resistance and/or minimum requirements of effective frictional engagement between the channel side walls and the ratchets on the nail.

Another object of the invention is to provide an improved ratchet nail which is so constructed and designed as to produce a rigid joint between the wall covering and nailing channel by being forcibly driven through the wall covering and into non-retractible engagement with the nailing channel both behind its nose and nearer its head.

Other objects and advantages of the present invention will become apparent upon consideration of the following detailed description and accompanying drawing wherein:

FIG. 1 is a partial side elevational view illustrating a typical wall construction including suitable wall covering and incorporating an improved nailing channel and ratchet nail embodying the invention;

FIG. 2 is a partial elevational perspective view illustrating a nailing channel constituting a preferred embodiment of the invention;

FIG. 3 is an enlarged elevational view illustrating a ratchet nail constituting a preferred embodiment of the invention;

FIG. 4 is a partial enlarged sectional view taken on line 4—4 of FIG. 1 and showing the manner of securing the nailing channel to the floor runner;

FIG. 5 is a partial enlarged sectional view taken on line 5—5 of FIG. 1 and showing the nail receiving portion of the nailing channel of FIG. 2 and a typical wall covering after the ratchet nail of FIG. 3 has been forcibly driven through the wall covering and into non-retractible engagement with the nail receiving portion, to provide the desired rigid joint between the wall covering and the nailing channel; and FIG. 6 is an elevational view illustrating on a reduced scale a modification of the ratchet nail illustrated in FIG. 3.

Referring now to the drawing and particularly to FIG. 1, there is illustrated therein a typical partition wall construction 7 including suitable ceiling and floor, channel-shaped runners 8 and 9 having flanges 10 and 11 respectively, and suitable wall covering panels 12. The runners 8 and 9 may be fabricated from suitable sheet metal of the desired gauge, and the panels 12 are preferably formed of a thick intermediate layer 13 of gypsum sandwiched between fibrous outer layers 14, 15 as seen in FIG. 5.

The runners 8 and 9 are connected by the inventive nailing channels 16 preferably spaced apart the usual distance of 16 inches on centers for supporting the wall covering panels 12. As partially seen in FIG. 4, the nailing channels 16 are secured at each end in place between the opposed pairs of flanges of runners 8 and 9 by engagement with lugs 17 struck into the flanges following placement of the channels. In turn, panels 12 are securely fastened to the channels 16 by the inventive ratchet nails 18, to provide the desired rigid joint between the panels 12 and channels 16, and where the ends of adjacent panels 12 abut over a nailing channel 16, a suitable washer 18' is placed under the head of each nail 18 to overlap and hold down the abutting panel ends, as shown in FIG. 1.

Referring to FIGS. 2 and 4, the inventive channel 16 will now be described in detail. This channel is formed from preferably a single sheet of relatively light gauge metal, such as steel to provide a wall thickness of suitable gauge, such as 26 U.S.S. (United States Standard, also referred to as Manufacturer's Standard), and which gauge corresponds to .0179" plus or minus the usual .002" tolerance. This channel-forming sheet is bent or roll-formed into a uniform cross-sectional shape generally in the form of an I-beam throughout its length. While the channel is fabricated from preferably a single sheet for reasons of economy, it could also be made from two or more sheets forming plies to provide at least the aforesaid minimum wall thickness, and the various channel portions described below could be made separately and then rigidly secured together, as by welding, if so desired.

The elongated channel 16 includes opposed hollow outer nail receiving portions 19 connected by a relatively thin and flat inner web portion 20 having suitable cut-outs 21 for passage of the usual plumbing and electrical lines. Each nail receiving portion 19 includes flat inner side walls 22 and 23 forming the sides of the nail receiving portion, and flat outer end walls 24 and 25 forming the exposed face or outer surface of the nail receiving portion. Together, these side and end walls define a V-shaped primary chamber 26. The outer portions 24a, 25a of end walls 24, 25 respectively, are co-planar and extend toward each other from the outer ends of side walls 22, 23 respectively, to form a seat for panels 12, while their inner portions 24b, 25b converge inwardly to form a V-shaped recess 27 in the outer surface of the nail receiving portion 19, and at their inner edges define a plurality of interrupted slits or slots 28 which extend longitudinally of and substantially co-extensive with the nail receiving portion at the base of the recess 27 and the outer end of chamber 26. The interrupted slit or slot form is preferred in order to permit use of a single sheet and thereby provide maximum strength and rigidity, and it also ensures against undesirable flattening out of the side walls during nailing of the wall covering to the channel.

The side walls 22, 23 include outer sections 22a, 23a converging inwardly from the outer ends of the end walls 24, 25 respectively, and inner sections 22b, 23b converging inwardly at a substantially smaller included angle than the outer sections. These inner sections have first portions 22c, 23c respectively forming a continuous slot or elongated opening 29 extending longitudinally of and substantially coextensive with nail receiving portion 19 at the inner end of chamber 26 and in alinement with slits or slots 28. These inner sections also have second portions 22d and 23d then diverging from slot 29 and once again converging to define the opposing walls of a smaller, inwardly elongated and substantially oval shaped secondary chamber 30 alined with primary chamber 26, and to finally merge into web portion 20.

In the preferred embodiment illustrated, a flat single sheet of metal is first cut to form slits or slots 28 and cut-outs 21, after which it is bent or roll-formed in the usual manner to produce the web portion 20, side walls 22, and end walls 24, 25 and then the side walls 23, which at their innermost or free ends are welded to the web portion 20 as shown by numeral 31. In fastening channels 16 within runners 8 and 9, as partially shown in FIG. 4, the lugs 17 are struck into the flanges of the runners so that they securely engage the adjacent nail receiving portions 19 at the junctures of their side and end walls, thereby providing a simple, yet, most effective means for preventing undesirable shifting of the channels.

Referring to FIG. 3, the ratchet nail 18 which constitutes a preferred embodiment of the invention is preferably formed from suitable gauge metal bar stock such as 11 gauge, zinc or cadmium plated steel, and includes an enlarged head 32, and an elongated generally cylindrical stem 33 terminating in a pointed nose 35 and provided with a series of the usual frusto-conical ratchets 34 having their inclined surfaces converging toward nose 35. The stem 33 also has an elongated generally cylindrical reduced neck portion 36 arranged between and connecting both the ratchets 34 and the nose 35, the reduced neck portion being connected to the nose by a generally frusto-conical shoulder 37. As will be apparent the entire stem 33, including ratchets 34, nose 35 and reduced neck portion 36, has an outer diameter substantially greater than the width of slits or slots 28 to provide the desired forcible piercing action and snap back action of inner end wall portions 24b, 25b to be described in detail below.

Referring briefly to FIG. 6, the modified nail 18a illustrated therein is provided with an enlarged head 32a, stem 33a and ratchets 34a quite similar to those of nail 18. However, nose 35a is not nearly as long or as sharply pointed as nose 35, while reduced neck portion 36a is of elongated generally concave-cylindrical shape as opposed to the elongated generally cylindrical reduced neck portion 36, and is connected to nose 35a by a gradual merging therewith rather than by a distinct shoulder such as 37. Although the flatter nose 35a would be less likely to puncture the channel side walls, it has been found that the substantially steeper slope of the inner side wall sections 22b, 23b (FIGS. 4 and 5) sufficiently reduces the angle of incidence with the sharper nose 35 so as to preclude such undersirable puncturing for all practical purposes. It has also been found that the shoulder 37 assists in providing a more positive mechanical interlock with portions 22c, 23c (FIG. 5) than does reduced portion 36a.

Referring now to FIG. 5, the nail receiving portion 19 of channel 16 is shown therein after assembly with the wall covering and ratchet nail 18. As stated previously, the typical gypsum board, wall covering panel 12 is composed of the relatively thick layer 13 of gypsum sandwiched between the relatively thin fibrous outer layers 14, 15. In the drawing the outer layer 14 forms in effect the outer surface of the panel 12, while the outer layer 15 forms in effect the inner surface of the panel 12. After the panel is properly positioned against the nail receiving portion 19 of channel 16, the ratchet nail 18 is forcibly driven or hammered through panel 12 and primary chamber 26, the nose 35 of the nail piercing the panel and forcibly spreading apart the inner portions 24b, 25b of the end walls defining the slits or slots 28, as well as the portions 22c, 23c and 22d, 23d of the inner side wall sections 22b, 23b defining slot 29 and secondary chamber 30 respectively, the nose 35 finally coming to rest within the expanded secondary chamber 30.

As a consequence of this hammering operation, the slot defining portions of the end walls snap back into non-retractible engagement with the corresponding ratchet 34 intermediate nose 35 and head 32, while the portions 22c, 23c of the inner side wall sections 22b, 23b defining slot 29 also snap back into non-retractible engagement with reduced portion 36 and shoulder 37 behind nose 35. At the same time, portions 22d, 23d bulge out somewhat, and the ratchets 34 near head 32 are embedded within the wallboard panel 12. Moreover, the outer surface or layer 14 of panel 12 is deformed to countersink the head 32, and the inner surface or layer 15 of panel 12 abuttingly and firmly engages the seat forming outer portions 24a, 25a of end walls 24 and 25 respectively on the nail receiving portions 19.

All of this produces a rigid joint between the wall covering 12 and nailing channel 16, and effectively prevents "popping" or retracting of the nail, especially because of the additional non-retractible mechanical engagement of the reduced portion 36 and shoulder 37 with the side wall portions 22c, 23c defining slot 29. As will be apparent, a similar non-retractible engagement will occur between the reduced portion 36a of nail 18a and side wall portions 22c, 23c. However, as noted above, this will not be quite as positive a mechanical engagement as when a definite shoulder such as 37 on nail 18 is utilized.

In addition, the side wall sections 22b, 23b effectively and positively guide the nose of the ratchet nail into entering slot 29, the steep slope of these sections effectively preventing undesirable puncturing of the channel side walls. As a result, the gauge of the metal selected for fabricating channel 16 can be made relatively light to provide a wall thickness of whatever gauge is suitable, such as 26 U.S.S., inasmuch as its selection is influenced by structural requirements rather than by resistance to pointed nail puncture and/or minimum requirements of effective frictional engagement between the channel side walls and the ratchets on the nail, thereby making for an economical product.

In order to highlight, but not limit the invention, the following example of a practical working embodiment is given. As illustrated in FIG. 2, a typical inventive channel 16 of generally I-beam cross-section is formed from a single sheet of 26 gauge U.S.S. cold rolled electro-galvanized steel and has nominally a height or length H of 8' and width W of 2½", 3¼" or 3⅝" (depending upon wall thickness desired). The parts of the nail receiving portions 19 defining the primary chambers 26 have the following nominal dimensions, as shown in FIG. 4: $a=.875"$; $b=.375"$; $c=.250"$; $d=.500"$; $e=.187"$; $f=.250"$. As best seen in FIG. 2, the nominal length $g$ and spacing $h$ of slits or slots 28 are equal to 1¼" and ¼" respectively. Returning to FIG. 4, the nominal width $i$ of slots 29 range from .020" to .040", while the remaining parts of nail receiving portions 19 defining the secondary chambers 30 nominally have length $j=.250"$; outside width $k=.187"$, and an inside width $l=(.187"-2\times.018")=.151"$. Referring now to FIG. 3, a typical inventive ratchet nail 18 is formed from #11 gauge, zinc or cadmium plated steel preferably with 18 to 22 ratchets (34) per inch and of uniform ratchet taper, with the following nominal dimensions: $m=1.188"$ or $1.313"$ (depending upon the thickness of wall covering panels 12 employed); $n=.315"$ diameter; $p=.020"$; $q=1.031"$ or $1.156"$ (depending upon $m$); $r=.500"$; $s=.203"$; $t=.156"$; $u=.120"$ diam.; $v=.137"$ diam.; $w=.050"$; $x=.120"$ diam.; and $y=.145"$ diam. Referring also to FIG. 6, some typical nominal dimensions for nail 18a would be $m'=1⅛"$; $n'=¼"$ diam.; $r'=½"$; $s'=^{21}/_{64}"$; $t'=¼_{16}"$; $u'=.110"$ diam.; $v'=.140"$ diam.; $w'=.050"$; $x'=.080"$ diam.; $y'=.140"$ diam.; and $R=^{17}/_{32}"$ radius.

From the foregoing example it will be readily apparent that the dimensions $y$, $y'$ and $x$, $x'$ of nails 18, 18a respectively are always substantially larger than dimension $i$. Thus the desired non-retractible mechanical engagement between side wall portions 22c, 23c and the appropriate reduced portion of the stem behind the nose of either nail 18 or 18a is ensured, and "popping" or retraction of the nail is effectively prevented.

It will now be seen how the invention accomplishes each of its objectives, and the various advantages of the invention will now become apparent. While certain preferred embodiments of the invention have been described and illustrated herein, it is to be understood that various changes and modifications may be made in the invention without departing from the spirit thereof, the scope of the invention being determined by the appended claims. For example, the preferred embodiment of the nailing channel is in the form of a stud, which is normally considered as the basic support of a wall. However, the nail receiving portion could be readily adapted for use as part of a nailing channel normally intended to be used as a furring strip on an already existing wall, by flaring the secondary chamber forming portions of the side walls outwardly into a transverse, wall engaging flange, rather than merging into a web.

What is claimed is:

1. In wall construction including wall covering, the combination therewith of improved means, such as a nailing channel, for supporting said wall covering and improved means, such as a ratchet nail, for fastening said wall covering to said supporting means, said supporting means being formed of sheet metal, with an approximate wall thickness of 26 gauge U.S.S. and comprising a hollow fastening means receiving portion including inner side walls and outer end walls defining a primary chamber, said end walls extending from the outer ends of said side walls and converging inwardly to form a recess in the outer surface of said receiving portion and to define first fastening means receiving and engaging elongated restricted opening means adjacent the base of the recess and the outer end of said chamber, said side walls extending from the outer ends of said end walls and including outer sections converging inwardly and inner sections converging inwardly at a substantially smaller included angle than said outer sections to define second fastening means receiving and engaging elongated restricted opening means adjacent the inner end of said chamber and substantially alined with said first restricted opening means, and said inner sections then extending from said second restricted opening means and diverging therefrom, once again converging and merging to define a secondary chamber substantially alined with said primary chamber, said side walls being severally continuous and of single wall thickness between said outer ends of said end walls and such mergence, said fastening means having an enlarged head portion and an elongated portion terminating in a pointed nose and provided with a ratchet having its inclined surface converging toward said nose which is forcibly driven through said wall covering and primary chamber into said secondary chamber, said elongated portion having an elongated reduced neck portion arranged between said ratchet and nose, whereby the portions of said end walls defining said first opening means are forcibly spread apart and snap back into non-retractible engagement behind the ratchet on said elongated portion intermediate said reduced neck portion and head portion, and the portions of said inner sections defining said second opening means and secondary chamber are forcibly spread apart with the portions of said inner sections defining said second opening means snapping back into non-retractible engagement with said reduced neck portion behind said nose, the outer surface of said wall covering being firmly engaged by said head portion and said end walls being firmly engaged by the inner surface of said wall covering, thereby producing a rigid joint between said fastening means, wall covering and supporting means.

2. In wall construction including wall covering, the combination therewith of an improved nailing channel for supporting said wall covering and an improved ratchet nail for fastening said wall covering to said channel, said channel being formed of sheet metal, with an approximate wall thickness of 26 gauge U.S.S. and comprising a hollow outer nail receiving portion and an inner web portion, said receiving portion including inner side walls and outer end walls defining a primary chamber, said end walls extending from the outer ends of said side walls and converging inwardly to form a recess in the outer surface of said receiving portion and to define first nail receiving and engaging slit or slot means extending longitudinally of said receiving portion adjacent the base of the recess and the outer end of said chamber, said side walls extending from the outer ends of said end walls and including outer sections converging inwardly and inner sections converging inwardly at a substantially smaller included angle than said outer sections to define second nail receiving and engaging slot means extending longitiudinally of said receiving portion adjacent the inner end of said chamber and substantially alined with said first slit or slot means, and said inner sections then extending from said second slot means and diverging and once again converging to define a secondary chamber substantially alined with said primary chamber and to finally merge into said web portion in substantial alinement with said second slot means, said side walls being severally continuous and of single wall thickness between said outer ends of said end walls and such mergence, said ratchet nail having an enlarged head and an elongated stem terminating in a pointed nose and provided with a series of ratchets having their inclined surfaces converging toward said nose which is forcibly driven through said wall covering and primary chamber into said secondary chamber, said stem having an elongated reduced neck portion arranged between said ratchets and nose and connected to said nose, whereby the portions of said end walls defining said first slit or slot means are forcibly spread apart and snap back into non-retractible engagement behind the corresponding ratchet on said stem intermediate said reduced neck portion and head, and the portions of said inner sections defining said second slot means and secondary chamber are forcibly spread apart with the portions of said inner sections defining said second slot means snapping back into non-retractible engagement with said reduced neck portion behind said nose, the outer surface of said wall covering being firmly engaged by said head and said end walls being firmly engaged by the inner surface of said wall covering, thereby producing a rigid joint between said nail, wall covering and nailing channel.

3. In wall construction including wall covering, the combination therewith of an improved elongated nailing channel for supporting said wall covering and an improved ratchet nail for fastening said wall covering to said nailing channel, said channel being formed of sheet metal, with an approximate wall thickness of 26 gauge U.S.S. and comprising an elongated hollow outer nail receiving portion and an elongated and relatively thin inner web portion, said receiving portion including inner side walls and outer end walls defining a substantially V-shaped primary chamber, said end walls extending from the outer ends of said side walls and converging inwardly to form a substantially V-shaped recess in the outer surface of said receiving portion and to define first nail receiving and engaging slit or slot means extending longitudinally of said receiving portion adjacent the base of the recess and the outer end of said chamber, said side walls extending from the outer ends of said end walls and including outer sections converging inwardly and inner sections converging inwardly at a substantially smaller included angle than said outer sections to define second nail receiving and engaging slot means extending longitudinally of said receiving portion adjacent the inner end of said chamber and substantially alined with said first slit or slot means, and said inner sections then extending from said second slot means and diverging and once again converging to define a smaller and inwardly elongated, secondary chamber substantially alined with said primary chamber and to finally merge into said web portion in substantial alinement with said second slot means, said side walls being severally continuous and of single wall thickness between said outer ends of said end walls and such mergence, said nail having an enlarged head and an elongated generally cylindrical stem terminating in a pointed nose and provided with a series of ratchets having their inclined surfaces converging toward said nose which is forcibly driven through said wall covering and primary chamber into said secondary chamber, said stem having an elongated reduced neck portion arranged between said ratchets and nose and connected to said nose by a shoulder, whereby the portions of said end walls defining said first slit or slot means are forcibly spread apart and snap back into non-retractible engagement behind the corresponding ratchet on said stem intermediate said reduced neck portion and head, and the portions of said inner sections defining said second slot means and secondary chamber are forcibly spread apart with the portions of said inner sections defining said second slot means snapping back into non-retractible engagement with said reduced neck portion and shoulder behind said nose, the outer surface of said wall covering being firmly engaged by said head and the outer ends of said end walls being firmly engaged by the inner surface of said wall covering, thereby producing a rigid joint between said nail, wall covering and nailing channel.

4. In wall construction including wall covering, the combination therewith of improved elongated nailing channels for supporting said wall covering and improved ratchet nails for fastening said wall covering to said nailing channels, each channel being formed of sheet metal, with an approximate wall thickness of 26 gauge U.S.S. and having a substantially uniform cross section, generally in the form of an I-beam, substantially throughout its length and comprising elongated and opposed, hollow outer nail receiving portions connected by an elongated, relatively thin and flat, inner web portion, each receiving portion including substantially flat inner side walls and substantially flat outer end walls defining a substantially V-shaped primary chamber, said end walls having co-planar outer portions extending toward each other from the outer ends of said side walls to form a seat for said wall covering and inner portions converging inwardly to form a substantially V-shaped recess in the outer surface of said receiving portion and to define at their inner ends first nail receiving and engaging interrupted slit or slot means extending longitudinally of and substantially co-extensive with said receiving portion adjacent the base of the recess and the outer end of said chamber, said side walls including outer sections converging inwardly from the outer ends of said end walls and inner sections converging inwardly at a substantially smaller included angle than said outer sections, said inner sections having first portions defining second elongated continuous slot means extending longitudinally of and substantially co-extensive with said receiving portion adjacent the inner end of said chamber and substantially alined with said first slit or slot means, and second portions then diverging from said second slot means and once again converging to define the opposing walls of a smaller, inwardly elongated and substantially oval shaped secondary chamber substantially alined with said primary chamber and to finally merge into said web portion in substantial alinement with said second slot means, said side walls being severally continuous and of single wall thickness between said outer ends of said end walls and such mergence, each nail having an enlarged head and an elongated generally cylindrical stem terminating in a pointed nose and provided with a series of ratchets having their inclined surfaces converging toward said nose which is forcibly driven through the corresponding wall covering and primary chamber into the corresponding secondary chamber, said stem having an elongated generally cylindrical reduced neck portion arranged between said ratchets and stem and connected to said stem by a generally frusto-conical shoulder, whereby the inner portions of the corresponding end walls defining the corresponding first slit or slot means are forcibly spread apart and snap back into non-retractible engagement behind the corresponding ratchet on said stem intermediate said reduced neck portion and head, and the first and second portions of the corresponding inner side wall sections defining respectively the corresponding second slot means and secondary chamber are forcibly spread apart with said first portions defining said second slot means snapping back into non-retractible engagement with said reduced neck portion and shoulder behind said nose, the outer surface of the corresponding wall covering being firmly engaged by said head and the outer portions of the corresponding end walls being firmly engaged by the inner surface of the corresponding wall covering, thereby producing a rigid joint between the corresponding nails, wall covering and nailing channels.

References Cited by the Examiner
UNITED STATES PATENTS

| | | | |
|---|---|---|---|
| 359,310 | 3/87 | Axt | 189—37 |
| 1,200,594 | 10/16 | Curtis | 85—21 |
| 2,020,062 | 11/35 | Jackson | 85—21 |
| 2,225,574 | 12/40 | Thomson | 189—34 |
| 2,235,530 | 3/41 | Mercer | 85—8.8 |
| 2,467,558 | 4/49 | Kapnek | 189—37 |
| 2,848,803 | 8/58 | Schock | 85—5 |
| 2,931,470 | 4/60 | Brown | 189—34 |
| 2,972,274 | 2/61 | Bombard | 85—5 |
| 3,083,794 | 4/63 | Stovall | 189—34 |

FOREIGN PATENTS

| | | |
|---|---|---|
| 1,259,692 | 1961 | France. |
| 127,912 | 1927 | Germany. |

RICHARD W. COOKE, JR., *Primary Examiner.*

JACOB L. NACKENOFF, *Examiner.*